United States Patent [19]

Seeman

[11] Patent Number: 5,067,090

[45] Date of Patent: Nov. 19, 1991

[54] NUCLEAR SPECTROSCOPY METHOD AND APPARATUS FOR DIGITAL PULSE HEIGHT ANALYSIS

[75] Inventor: Bronislaw Seeman, Missouri City, Tex.

[73] Assignee: Schlumberger Technology Corporation, Houston, Tex.

[21] Appl. No.: 344,729

[22] Filed: May 1, 1989

[51] Int. Cl.⁵ .................. G01R 29/02; G06F 15/52
[52] U.S. Cl. .................. 364/486; 250/269; 364/422; 364/527; 364/555
[58] Field of Search ........... 250/369, 269, 270, 261, 250/390; 364/422, 486, 527, 555, 575, 581, 604; 340/825.15, 825.17, 825.57; 328/115, 109

[56] References Cited

U.S. PATENT DOCUMENTS

| | | | |
|---|---|---|---|
| 2,961,641 | 11/1960 | Dewan et al. | 340/825.15 |
| 3,582,655 | 6/1971 | Hoyer et al. | 250/270 |
| 3,668,426 | 6/1972 | Culver | 328/115 |
| 3,710,112 | 1/1973 | Caldwell et al. | 250/270 |
| 3,767,921 | 11/1973 | Jones | 250/261 |
| 4,068,180 | 1/1978 | Nelligan | 328/109 |
| 4,157,469 | 6/1979 | Randall | 250/269 |
| 4,268,749 | 5/1981 | Mills, Jr. | 250/269 |
| 4,471,435 | 9/1984 | Meisner | 250/270 |
| 4,476,391 | 10/1984 | Bednarczyk | 250/390 |
| 4,481,597 | 11/1984 | Robbins | 364/604 |
| 4,580,056 | 4/1986 | Kaiser et al. | 250/390 |
| 4,599,690 | 7/1986 | Stoub | 364/527 |
| 4,628,202 | 12/1986 | Minette | 250/269 |
| 4,642,800 | 2/1987 | Umeda | 364/422 |
| 4,665,486 | 5/1987 | Schultz | 364/422 |
| 4,712,007 | 12/1987 | Ondrik | 250/270 |
| 4,730,263 | 3/1988 | Mathis | 364/527 |
| 4,747,060 | 5/1988 | Sears, III et al. | 364/422 |
| 4,749,859 | 6/1988 | Schmidt | 250/269 |
| 4,883,956 | 11/1989 | Melcher et al. | 250/269 |

OTHER PUBLICATIONS

Radiation Detection & Measurement; G. F. Knoll; pub. John Wiley & Sons (1989), pp. 660–661.
LeCroy, pp. 38–39, 42, 8 and 9, no date.
EG & G Ortec, "ADCAM Analyst Multichannel Analyzer", no date.

Primary Examiner—Kevin J. Teska
Attorney, Agent, or Firm—Henry N. Garrana; Frederic C. Wagret

[57] ABSTRACT

A nuclear spectroscopy method for pulse height analysis of an electrical signal emitted by a radiation detector and including nuclear events, such as pulses, whose amplitude is a measure of the energy of the gamma rays collected by said radiation detector, wherein (1) said signal is continuously converted to digital samples, at a given rate, and (2) each of the digital samples is processed so as to form a digital image of each detected pulse. The energy of each pulse is calculated by summing all sample values representative of this pulse and the sample just preceding the first sample representative of a pulse, as well as the sample just following the last sample representative of the same pulse.

27 Claims, 4 Drawing Sheets

NUCLEAR SPECTROSCOPY METHOD AND APPARATUS FOR DIGITAL PULSE HEIGHT ANALYSIS

BACKGROUND OF THE INVENTION

1. Field of the invention

This invention relates generally to the analysis and process for indicating the amplitude distribution of random-amplitude pulse signals, such as those generated by a scintillation detector / photomultiplier.

2. Description of the prior art

Such devices are commonly used in many technical areas where measurements involve nuclear particles and radiation detection, one among others being e.g. the well logging techniques, wherein a tool is lowered in a well to carry out physical measurements. Of the many well logging instruments and techniques developed over the years to determine the hydrocarbon content and productivity of earth formations, the spectroscopy tool, by which energy spectra of the constituents of formation matrices and fluids are generated, has been found to provide information of particular value in formation analysis. Typically, the energy spectra are obtained by detecting either natural gamma rays or gamma rays resulting from the interaction between formation nuclei and high energy neutrons irradiating the formation, and converting each detected gamma ray into an electrical pulse whose amplitude is a measure of the gamma ray energy. These pulses are then sorted according to height in a pulse height analyzer to develop energy spectra characteristic of the constituents of the earth formations near the tool.

The book "*Radiation Detection and Measurement*" by Glenn F. Knoll (1979) depicts a typical pulse height analyzer, especially pages 720–725. The analyzer is disposed at the output of a scintillator detector linked to a photomultiplier, and is adapted to carry out an analog-to-digital conversion. A Prior art analyzer is usually comprised of two main components, i.e. an analog/digital converter (hereafter referred to as ADC) and a memory. It also comprises, upstream of the ADC, an input gate which prevents pulses from reaching the ADC when the latter is busy, and another linear gate controlled by a single channel analyzer adapted to determine whether the amplitude is above a given threshold, and thus being representative of a pulse. Electronic filters, for amplifying and signal shaping purposes, are also provided at the input of the pulse height analyzer. Since, basically, an ADC can only process one pulse at a time, simultaneous pulses, or successive pulses very close one to the other in time, cannot be processed, and thus detected; in other words, these pulses are lost, thus altering the reliability of the measurement. Accordingly, the faster the analyzer works, the more pulses are detected. However, the known analyzers comprise analogic circuitry, which implies (i) relative low speed processing (ii) relative high costs and (iii) drift with time or temperature. The only attempt made until now for obviating the consequences of the low processing speed rely on discrimination circuits, which distinguish single pulses from stacked pulses, also called "pile-up" pulses; however, said circuits increase the complexity of the analyzer without giving a satisfactory answer to this problem.

Furthermore, since such analyzers, depending upon the field of use, are located either downhole, in aircraft or in satellites, where room is limited and environmental conditions are severe, the pulse height analyzer should be compact and made of high reliability electronic components. Nevertheless, known analyzers are made of numerous components, thus involving relative bulk, as well as difficult and costly adjustments due to functional dispersion.

Moreover, a method has already been proposed wherein the analogic pulse signals are digitized and stored during a time window and wherein the digital data accumulated in the memory are then processed by a computer. However, this known delayed process is time consuming and is not consistent with the requirements of the real time spectrum analysis technique.

SUMMARY OF THE INVENTION

A general object of the invention is to provide a pulse height analyzer showing high reliability, high speed processing, compactness, and being of low cost.

The foregoing and other objects are attained in accordance with the invention by a nuclear spectroscopy method for pulse height analysis of a signal, emitted by a radiation detector, such as a scintillator—photomultiplier device, and containing nuclear events, represented by pulses, whose amplitude is a measure of the energy of the particles, such as gamma rays, collected by said radiation detector, said method comprising the following successive steps:

(1) continuously converting said signal to digital samples at a given rate; and
(2) processing each of said digital samples so as to form a digital image of each detected nuclear event.

The method of the invention also includes the step of detecting the arrival of a pulse, by comparing each incoming sample to a threshold value, so as to determine whether the sample is representative of a pulse. More specifically, the difference between the incoming sample value and the base signal which is free of nuclear events, is calculated and compared to said threshold. Furthermore, the time of arrival of any detected pulse is recorded.

Moreover, the base signal value is continuously updated at each sample time arrival, so as to generate a current base signal value; preferably, the updated value is a weighted average of the incoming sample with the preceding sample, or preceding samples.

Once a pulse has been detected, the energy of said pulse is calculated by summing the difference between each sample value (representative of the pulse) and the current base signal value, said sum being continuously stored in a register.

During the energy calculation, the accumulated sum is compared to a preset value and said register is reset in case of overflow.

Advantageously, for each detected pulse, the sample just preceding the first sample representative of said pulse, as well as the sample just following the last sample representative of said pulse, are both taken into account for said pulse energy calculation.

The method further includes the step of detecting a stack of successive pulses close one to the other in time. As a preferred embodiment, the detection step consists in counting of the number of samples representative of a detected nuclear event and comparing said count to a predetermined maximum count value.

In another preferred embodiment, the sampling step is carried out by a flash analog-to-digital converter (ADC). Furthermore, the processing of the digital samples is carried out with a bit range greater than the bit range of the ADC, and mathematical operations on samples (such as multiplication) are implemented through bit shifts.

DESCRIPTION OF THE PREFERRED EMBODIMENTS

As mentioned, the present invention affords improved apparatus for pulse height analysis, which by way of example, has particular utility in well logging applications, and a representative embodiment of the invention is described and illustrated herein in that environment. It will be understood, however, that this is merely illustrative of but one of the various applications for which the invention is suitable.

Figure 1:
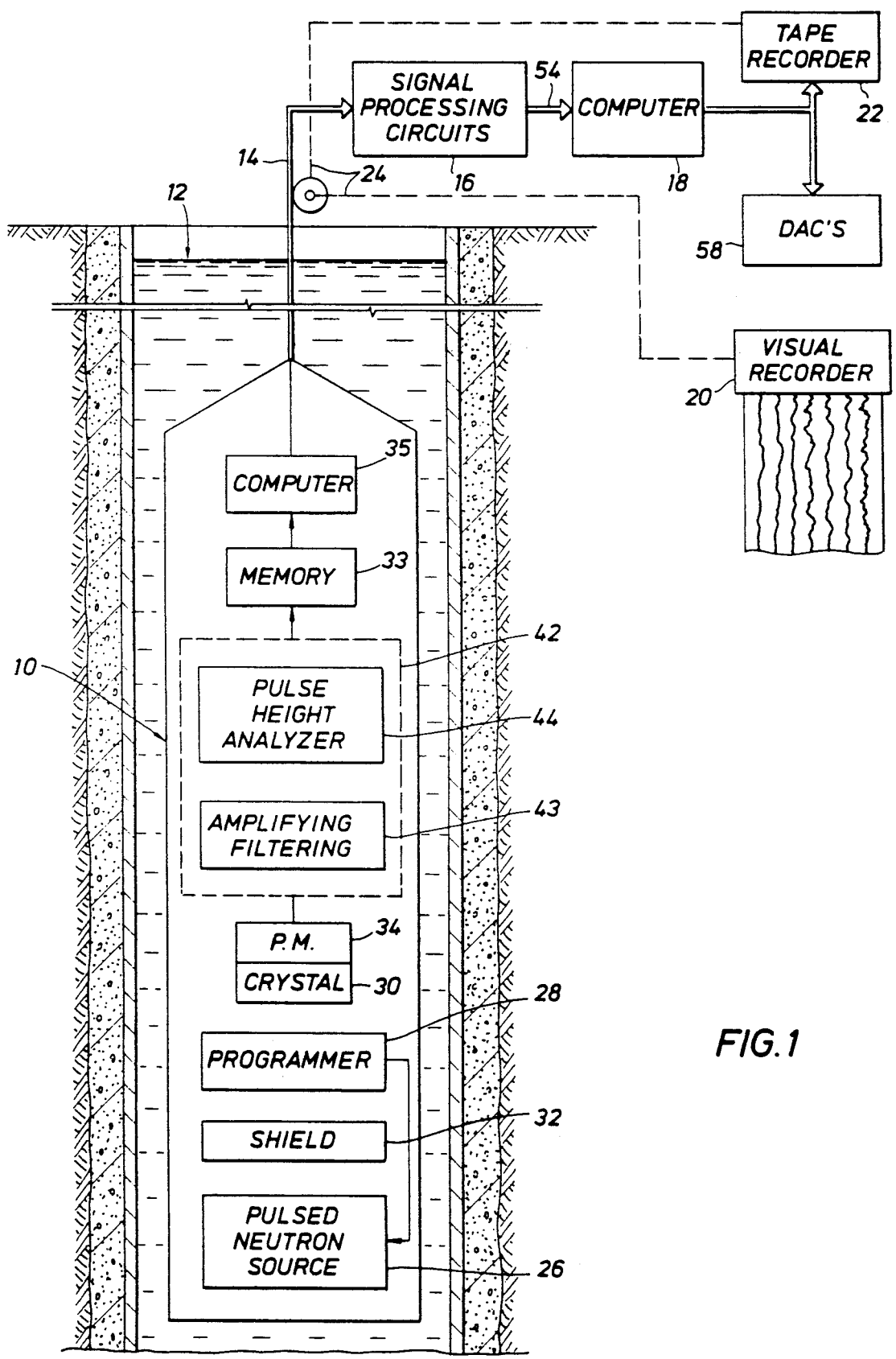
FIG. 1 is a block diagram of an example of application of the invention in the form of a logging tool.

FIG. 1 illustrates a spectroscopy logging tool 10 suspended in a borehole 12 by an armored cable 14. The tool 10 might be of the type described in U.S. Pat. No. 4,031,367, issued to Richard D. Murphy on June 21, 1977. The cable 14 also provides electrical connections between the tool 10 and the uphole electronics, which include a computer 18, a visual recorder 20, a magnetic tape recorder 22 and additional intermediate signal processing circuits 16. Computer 18 suitably is a general purpose digital computer, such as that manufactured by Digital Equipment Corporation, Maynard, Massachusetts, under the designation PDP-11. The recorders 20 and 22 are coupled to the cable 14 by the usual mechanical linkage 24 for making the customary records of the logged values as a function of tool depth. Appropriate power supplies (not shown) are provided at the surface and in the well tool, for supplying power to the uphole and downhole electronics.

The tool 10 includes a pulsed neutron source 26 which, under the control of a programmer 28, emits successive pulses or bursts of 14 Mev neutrons into the formations surrounding the borehole 12. Gamma radiation resulting from interactions between the neutrons and formation nuclei, e.g. inelastic collision gamma rays, is detected by a scintillation crystal 30. The usual shield 32 is interposed between the crystal 30 and the neutron source 26. The crystal 30 is optically coupled to a photomultiplier tube 34 which, in response to a detected gamma ray, generates a pulse signal whose amplitude is representative of the energy of the gamma ray. Output pulses from the photomultiplier 34 are passed by a spectrum analyzer 42 including amplifying-filtering circuits 43 and a pulse height analyzer 44, the output of which is linked to a memory 33, itself feeding a computer 35.

At the surface, the data-bearing signals from the pulse height analyzer 44 are amplified, decoded and otherwise processed in the signal processing circuits 16 for coupling over a conductor bundle 54 to the computer 18. Digital spectroscopy outputs are transmitted to the tape recorder 22 and, through appropriate digital-to-analog converter (DAC) circuits 58, to the visual recorder 20. Emphasis is again laid upon the fact the present invention can also, as an alternative, be implemented in a natural gamma ray tool.

Figure 2:
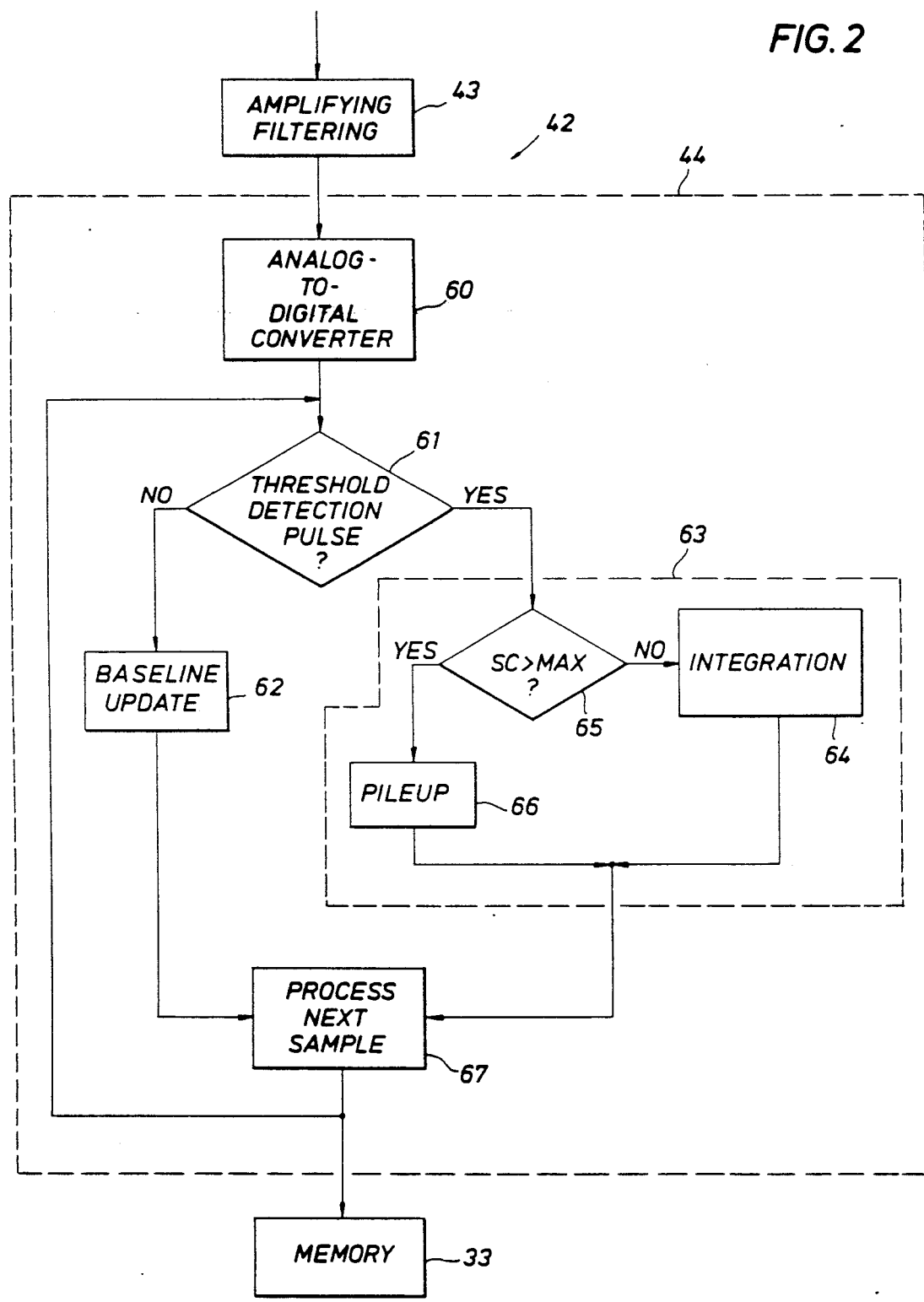
FIG. 2 is a functional block diagram of the spectrum analyzer of the invention.

FIG. 2 shows a diagram of the spectrum analyzer 42 of the invention including amplifying-filtering circuits 43, receiving analog signals from the photomultiplier 34, and followed by the pulse height analyzer 44. Amplifying-filtering circuits are well known in the art and mainly comprise amplifiers and filters. Filtering allows one to shape the train of pulses in a predetermined fashion so that said pulses can be easily further processed. Filters are e.g. of the differential integrator type (CR-RC), and more specifically of CR-(RC)$^n$ type, realizing a Gaussaian curve. More details about such filters can be found in the book (pages 614–623) by Glenn F. Knoll already referred to.

Figure 3:
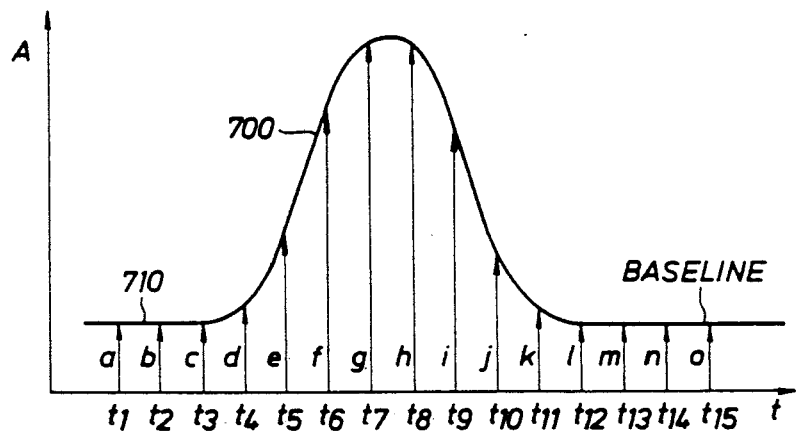
FIG. 3 shows a schematic representation of a pulse and the corresponding sampling times.

FIG. 3 shows an example of a pulse 700 (amplitude "A" versus time "t") having a Gaussian shape, while the essentially constant signal 710 corresponds to the noise or background level, i.e. when no pulses are delivered by photomultiplier 34. This constant signal is called the baseline B by one skilled in the art. Are also shown successive samples "a, b, c, ... m, n, o" representative of the amplitude of the signal at successive instants $t_{1-t15}$ Turning back to FIG. 2, the pulse height analyzer 44 comprises an analog-to-digital converter 60, which receives the analog signal issued from amplifying-filtering circuits 43 and converts said signal to digital samples at a given rate (ranging e.g. from a few MHz to a few tens of MHz). The ADC is preferably a flash ADC, such as, e.g., the 8-bit CMOS Flash converter HS 9584 manufactured by Hybrid Systems Corp. For each instantaneous sample S, the difference between said samples and the baseline B is compared to a threshold value T, arbitrarily chosen, via a threshold detector 61. This step allows detection of an incoming pulse each time an incoming sample S, such as e.g. sample "e" of FIG. 3, of pulse 700 exceeds the baseline B by the threshold value T.

In case the difference (S-B), i.e. sample minus baseline, is below threshold (T), said sample is not representative of a pulse, but of the baseline B. Said sample value S is used for updating the baseline value B, via a baseline update unit 62, connected to the "NO pulse" output of said threshold detector 61, and the function of which will be further described. Any difference value (S-B) above the threshold T implies the instant sample S is representative of a pulse 700, and is thus directed from threshold detector 61 to a pulse processing unit 63. In most cases, the successive incoming samples, which are representative of a single pulse 700, are directed via sample count detector 65 to an integration unit 64, which stores and processes said samples so as to calculate the energy of said pulse.

However, since the kind of nuclear events the invention is directed to are random events, it often happens that successive pulses are quite simultaneous or very close one to the other in time; thus, the corresponding nuclear event is actually a stack of successive pulses which involves loss of information. This phenomenon is called "pile-up" by one skilled in the art. Means for detecting such pile-up events is dependent on the duration of the events, in other words, on the number of samples corresponding to the event. So as to detect and recover lost information, a given number of maximum samples S for a single pulse, is chosen. In this case, said maximum number is set to seven. This maximum number is depending upon the duration of an average pulse and upon the sampling frequency. Accordingly, the pulse processing unit 63 (at the output of threshold detector 61) is provided with a sample count detector 65 (initials SC shown on FIG. 2 stands for Sample Count) which directs the incoming sample, depending upon the number of samples representative of the same pulse 700 which have already been processed before said incoming sample, either to said integration unit 64 (if SC is less than or equal to the maximum count 7) or to a pile-up unit 66 (if SC is more than maximum count 7). The output of pulse processing unit 63 and the output of said baseline update unit 62, are connected to a process next sample unit 67. The output of the process next sample unit 67 is fed to memory 33 and to the threshold detector 61.

Figure 4:
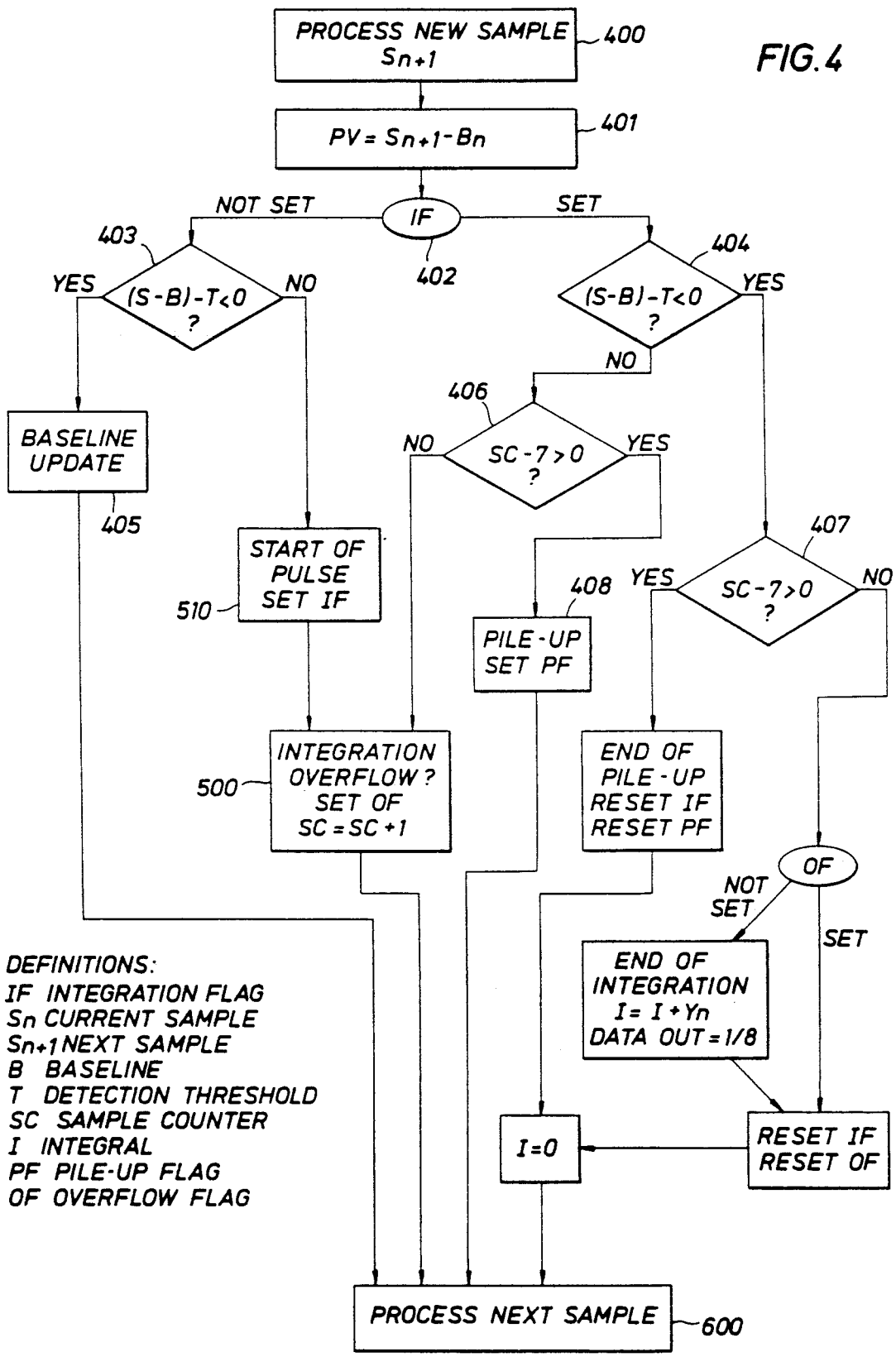
FIG. 4 is a detailed flow chart of the pulse height analyzer of the invention.

FIG. 4 shows a detailed flow chart of the process implemented in the pulse height analyzer 44 according to the invention. For each new sample S issued from ADC 60, a processing value PV is calculated (block 401) as said new sample S minus baseline B. A pulse flag IF (block 402) is provided and is SET each time an incoming pulse has been detected; said flag is otherwise NOT SET i.e. when no pulse has been detected. SET and NOT SET alternative is represented by two flow directions downstream of said IF flag, namely two threshold detection blocks 403 and 404, both performing a comparison between said processing value PV (sample S - baseline B) and the threshold T. Supposing the IF flag is NOT SET, threshold detection 403 leads to an alternative: if (1) the difference PV-T is negative, the baseline value B is thus updated (block 405) by weighted average of the incoming sample representative of the baseline and the previous current baseline value, so as to generate a new current baseline value; and if (2) said difference PV-T is positive, the incoming sample is thus representative of a pulse; the IF flag is SET (block 510), and the integration step 500 starts, while storing and gathering the different samples S representative of a pulse 700. The integration step 500 allows also to take in account, as a pulse representative sample, the sample just preceding and the sample just following, respectively, the first and the last samples which are representative of a pulse. After the integration step 500 and the baseline update 405, the next sample is processed (block 600). Referring back to the IF flag 402, supposing it is in the SET position (i.e. a pulse has been detected), the incoming sample value S minus the baseline value B, is compared to the threshold T (see threshold detection block 404) in the same way as already described, and a maximum sample count detection is carried out (see blocks 406 and 407), so as to determine whether more or less than a given number of samples (in this case seven) have been identified as being representative of the same pulse.

Supposing the threshold detection (block 404) is positive (i e the incoming sample is representative of a pulse) therefore leading to the maximum sample count detector 406. A negative output of maximum sample count (from 406) leads to said integration 500; a positive output of maximum sample count detection 406 means that the duration of the incoming pulse is longer than a given duration (corresponding to an average pulse) i.e., the incoming nuclear event is actually made of pile-up pulses. The incoming sample is thus directed to a "pile-up" processing unit 408, including a pile-up flag PF, which is moved to a SET position. The goal of said pile-up processing unit 408 is to recover the lost information from the different piled-up pulses, such units being well known in the art and examples can be found in the book by G.F. Knoll. The pile-up process is repeated for each sample fulfilling the corresponding conditions.

Supposing now the threshold detection 404 is negative, i.e. the incoming sample is not representative of a pulse, and more specifically, supposing that said incoming sample is the last of a sample series forming part of the pulse which has just been processed (since the integration flag is SET). Again, a maximum sample count detection (407) is carried out. A positive detection output from 407 means the pile-up process, which was ongoing, has to come to an end, and the integration flag is thus moved to the NOT SET position. A negative maximum sample count detection from 407 means the ongoing integration process is over and said negative pulse count leads to an additional alternative, depending upon whether data overflow flag (OF) is either SET or NOT SET. If the OF flag is NOT SET, it is SET in the integration step 500 each time the pulse amplitude data reaches a maximum value corresponding to an overflow value. If the OF flag is SET, before processing the next sample, the OF and IF flags are reset to the NOT SET position. It has to be noted that, at the very beginning of the pulse height analysis here above described, all flags are placed in the NOT SET position.

Figure 5:
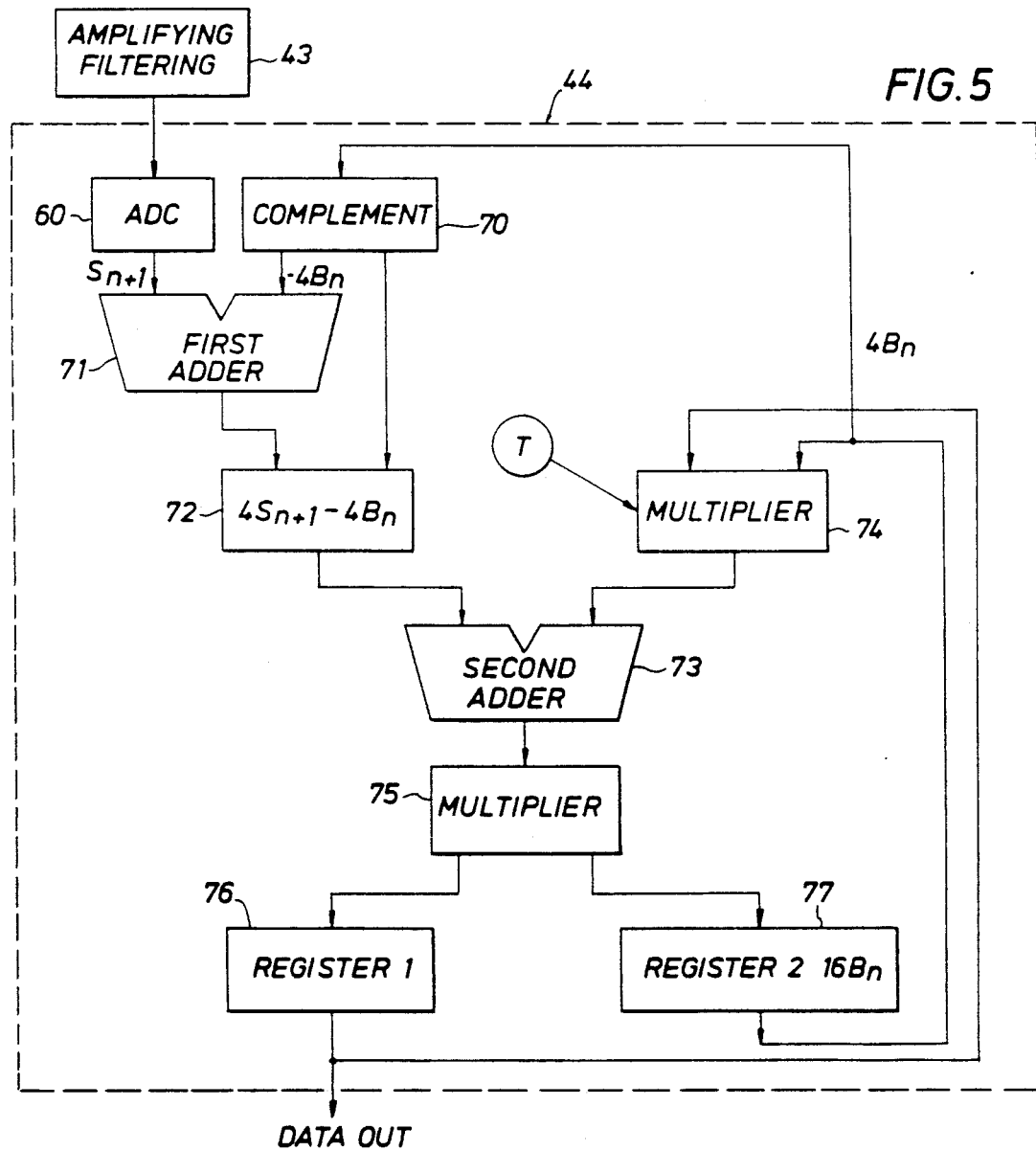
FIG. 5 is a functional chart showing the detailed process of digital samples through the pulse height analyzer according to the invention.

Refer now to FIG. 5, which shows an example of implementation of the different functions, above described, performed by the pulse height analyzer 44.

The output of the ADC 60 is fed to a first adder 71 which also receives the output of a complement circuit 70; said complement circuit delivers at its output the input signal with an inverted sign (e.g. positive value A thus becomes $-A$). Said first adder 71 is linked to a shift register bank 72 which, also receives data from said complement circuit 70. A second adder 73 receives the output of said shift register bank 72 and of a first multiplexer 74, and feeds a second multiplexer 75, which directs data either to a first register 76 or to a second register 77. First multiplexer 74 also receives data from a memory T which stores the threshold value T. The outputs of both first and second registers 76 and 77 are fed to said first multiplexer 74.

The way data are processed through pulse height analyzer 44, is schematically explained hereafter. As already mentioned, the update of the current baseline value $B_{n+1}$, is carried out by weighted average, according to the following formula, given by way of example:

$$B_{n+1} = \tfrac{1}{4} S_{n+1} + \tfrac{3}{4} B_n \qquad [1]$$

subscripts "n" and "n+1" standing for, respectively, previous and incoming values. Accordingly, the incoming sample $S_{n+1}$ (which is representative of the baseline) is granted a weight of $\tfrac{1}{4}$, while the previous baseline value $B_n$ is allotted a greater weight, of $\tfrac{3}{4}$. Other weighting factors may of course be used, as well as the weighted average can also take into account more than one previous baseline value.

Multiplication of [1] by 16, and writing 12 as equal to $16-4$, gives:

$$16\, B_{n+1} = (4\, S_{n+1} - 4\, B_n) + 16 B_n \qquad [2]$$

where $$(4 S_{n+1} - 4 B_n) = PV$$

i.e. the processing value already referred to in connection with FIG. 4;

Thus, divisions in equation [1] have been replaced by multiplications. In the analyzer 44, multiplications are carried out by bit shifts; e.g., the product (4 $S_{n+1}$) is made by adding to the digital value $S_{n+1}$ two binary zeros. The second register 77 stores the value of the current baseline value (16 $B_n$), and delivers to said complement circuit 70 the value (4 $B_n$), by removing two bits, in this case, the less significant ones. Said bits are used only for updating the baseline, and are not used during said integration step (corresponding to a sample above threshold). Second adder 73 performs the calculation according to formula [2]. The threshold detection, already referred to in connection with FIG. 4 (blocks 403 and 404), allows actuation of both multiplexers 74 and 75. Depending upon the result of the threshold detection, second adder 73 is fed, by first multiplexer 74, with the value coming either from first register 76 or second register 77. Also, depending upon the result of said threshold detection, the value calculated by second adder 73, is directed, through second multiplexer 75, either to the first register 76 for integration purpose (block 500 on FIG. 4), or to the second register 77 for updating the baseline (block 405 on FIG. 4). Shift register bank 72 is designed to store the values preceding the incoming value (i.e. the value under process), so as to take into account for the calculation of the energy of the pulse under process, the sample just preceding the first sample representative of the detected pulse, as well as the sample just following the last sample representative of said pulse.

While data issued by ADC 60 are digital data of 8 bit range, digital process in the pulse height analyzer 44 is carried out with a 10 bit accuracy in order to reduce round-off errors in the baseline subtraction.

A final and very important benefit of the instant invention is that linearity error (both differential and integral) of the pulse height measurement, is substantially reduced with respect to the linearity error of the ADC used. This is due to the fact that each pulse height determination is an accumulation of several ADC outputs, taken at different voltage levels in a random fashion, since there is no synchronism between the nuclear events and the clock used to sample the signal. Therefore, any local nonlinearities of the sample digitization process are reduced through averaging.

Although the invention has been described and illustrated with reference to a specific embodiment thereof, it will be understood by those skilled in the art that various modifications and variations of that embodiment may be made without departing from the invention concepts disclosed. Accordingly, all such modifications are intended to be included within the spirit and scope of the appended claims.

The digital circuitry of pulse height analyzer is preferably made as a custom integrated circuit.

What is claimed is:

1. A nuclear spectroscopy method for pulse height analysis of an electrical signal containing pulses representative of nuclear particles, the amplitude of said pulses being a measure of the energy of said nuclear particles, said method comprising the following successive steps:

(1) detecting said particles and forming an electrical signal containing pulses representative of said particles;
   (2) continuously converting said signal to digital samples, at a given rate;
   (3) determining whether said digital sample is representative of a pulse, and forming a digital image of each pulse; and
   (4) sorting said digital images into a plurality of channels according to the energy of the corresponding particles.

2. The method according to claim 1 wherein the conversion step is carried out by an analog-to-digital converter (ADC) of the flash type.

3. The method according to claim 2 wherein the processing of the digital samples is carried out with a bit range greater than the bit range of said ADC.

4. The method according to claim 2 wherein mathematical operations on said digital samples are implemented through bit shifts.

5. The method according to claim 1 wherein said determining step comprises comparing each digital sample to a predetermined threshold digital value.

6. The method according to claim 5 wherein the time of arrival of any detected pulse is recorded.

7. The method according to claim 5 including the step of determining whether a detected pulse is a stack of successive pulses close one to the other intime, by counting of the number of samples representavive of said nuclear event, and comparing said count to a predetermined maximum count value.

8. The method according to claim 1 further comprising, between converting and processing steps:

(1) generating a baseline value corresponding to a baseline signal which is free of nuclear events;
   (2) calculating the difference between each digital sample and said baseline value; and
   (3) comparing said difference with a predetermined threshold value so as to determine whether said digital sample is representative of a pulse.

9. The method according to claim 8 wherein said baseline value is continously updated by combining the digital sample just being generated and which is not representative of a pulse with the previous baseline value.

10. The method according to claim 9 wherein said combining step comprises making a weighted average of the sample just being generated and at least the preceding sample, both samples being not representative of a pulse.

11. The method according to claim 8 wherein, once a pulse has been detected, the energy of said pulse is calculated by summing the differences between each sample value representative of siad pulse and said baseline value.

12. The method according to claim 11 wherein, for each detected pulse, the sample just preceding the first sample representative of said pulse, as well as the sample just following the last sample representative of said pulse, are both used for said pulse energy calculation.

13. A nuclear spectroscopy logging method for determining characteristics of earth formations, comprising the steps of:

(1) detecting particles coming from the formations, resulting either from natural radioactivity, or from interactions between said formations with high energy neutrons irradiating said formations;

(2) converting each detected particle into an electrical signal containing pulses whose amplitude is a measure of the energy of said particle;
(3) continuously converting said signal to digital samples at a given rate;
(4) determining whether said digital sample is representative of a pulse, and forming a digital image of each detected pulse; and
(5) sorting said digital images into a plurality of channels according to the energy of the corresponding particles.

14. Nuclear spectroscopy apparatus for pulse height analysis of a n electrical signal containing pulses representative of nuclear particles, the amplitude of said pulses being a measure of the energy of said nuclear particles, said apparatus comprising:
(1) means for detecting said particles and forming an electrical signal representative of said particles;
(2) means for continuously converting said signal to digital samples, at a given rate;
(3) means for determining whether digital sample is representative of a pulse, and forming a digital image of each nuclear pulse; and
(4) means for sorting said digital images into a plurality of channels according to the energy of the corresponding particles.

15. Apparatus according to claim 14 wherein said conversion means comprises an analog-to-digital converter (ADC) of the flash type.

16. Apparatus according to claim 15 wherein the processing means of the digital samples comprises digital circuits having a bit range greater than the bit range of said ADC.

17. Apparatus according to claim 16 wherein said digital circuits carry out mathematical operations on samples through bit shifts.

18. Apparatus according to claim 14 comprising means for determining whether said digital sample is representative of a pulse by comparing each digital sample to a predetermined threshold value.

19. Apparatus according to claim 18 wherein said pulse detection means include pulse arrival time detection means.

20. Apparatus according to claim 18 comprising means for determining whether a detected pulse is a stack of successive pulses close one to the other in time, including means for counting the number of samples representative of said nuclear event, and for comparing said count to a predetermined maximum count value.

21. Apparatus according to claim 18 comprising means for calculating, once a pulse has been detected, the energy of said pulse by summing the differences between each said sample which is representative of said pulse and said baseline value.

22. Apparatus according to claim 21 wherein said calculating means comprises means for including, for each detected pulse, the sample just preceding the first sample representative of said pulse, and the sample just following the last sample representative of said pulse, in said pulse energy calculation.

23. Apparatus according to claim 18 wherein said pulse determination means includes;
(1) means for generating a baseline value corresponding to a baseline signal which is free of nuclear events;
(2) means for calculating the difference between the digital sample and said baseline value; and
(3) means for comparing said difference with a predetermined threshold value so as to determine whether said digital sample is representative of a pulse.

24. Apparatus according to claim 23 comprising means for continuously updating said baseline value by combining the digital sample just being generated and which is not representative of a pulse with the previous baseline value.

25. Apparatus according to claim 24 wherein said updating means includes means for making a weighted average of said digital sample just being generated and at least the preceding digital sample which is not representative of a pulse.

26. A nuclear spectroscopy logging apparatus for determining characteristics of earth formation, comprising:
(1) means for detecting particles coming from the formations, resulting either from natural radioactivity, of from interactions between said formations with high energy neutrons irradiating said formations;
(2) means for converting each detected particle into an electrical signal containing pulses whose amplitude is a measure of the energy of said particle;
(3) means for continuously converting said signal to digital samples at a given rate;
(4) means for determining whether said sample is representative of a pulse, and forming a digital image for each detected pulse; and
(5) means for sorting said digital images into a plurality of channels according to the energy of the corresponding particles.

27. Apparatus according to claim 26 wherein said pulse height analysis means comprises a custom integrated circuit.

* * * * *